(12) United States Patent
Essary et al.

(10) Patent No.: US 10,548,311 B2
(45) Date of Patent: Feb. 4, 2020

(54) DECOY

(71) Applicant: Top Down Decoys LLC, Viola, IL (US)

(72) Inventors: Jason M Essary, Sherrard, IL (US); Robert L Essary, Sr., Viola, IL (US)

(73) Assignee: Top Down Decoys, LLC, Viola, IL (US)

( * ) Notice: Subject to any disclaimer, the term of this patent is extended or adjusted under 35 U.S.C. 154(b) by 0 days.

(21) Appl. No.: 16/362,089

(22) Filed: Mar. 22, 2019

(65) Prior Publication Data

US 2019/0297872 A1 Oct. 3, 2019

Related U.S. Application Data

(60) Provisional application No. 62/649,090, filed on Mar. 28, 2018.

(51) Int. Cl.
*A01M 31/06* (2006.01)

(52) U.S. Cl.
CPC .................. *A01M 31/06* (2013.01)

(58) Field of Classification Search
CPC ..................................... A01M 31/06
USPC ............................................. 43/3
See application file for complete search history.

(56) References Cited

U.S. PATENT DOCUMENTS

| | | | |
|---|---|---|---|
| 554,368 A * | 2/1896 | Kunselman | A01M 31/06 43/3 |
| 1,782,042 A * | 11/1930 | Kunkel | A63H 7/00 43/3 |
| 2,441,753 A | 5/1948 | Carpenter | |
| 2,450,572 A | 10/1948 | Virgil | |
| 2,762,590 A * | 9/1956 | Huie | A63H 27/08 244/153 R |
| 2,783,572 A | 3/1957 | Rohan | |
| 2,857,623 A * | 10/1958 | Clark | B29C 33/26 249/55 |
| D185,866 S | 8/1959 | Anderson | |
| 3,245,168 A * | 4/1966 | Pool | A01M 31/06 43/3 |
| 3,350,808 A * | 11/1967 | Mitchell | A01M 31/06 43/3 |
| 3,707,798 A | 1/1973 | Tryon | |
| 3,800,457 A | 4/1974 | Barrett | |
| 4,432,158 A * | 2/1984 | Nicholas | A63H 15/04 428/16 |
| 4,651,457 A * | 3/1987 | Nelson | A01M 31/06 428/16 |

(Continued)

FOREIGN PATENT DOCUMENTS

CA 2347341 A1 * 1/2002 ............ A01M 31/06

*Primary Examiner* — Magdalena Topolski
(74) *Attorney, Agent, or Firm* — Hamilton IP Law, PC; Jay R. Hamilton; Charles A. Damschen

(57) ABSTRACT

A decoy is configured of a body portion, a neck portion and a head portion wherein a rod may be inserted in the head for connecting the decoy to a ground surface such as water or dry land. The decoy is relatively flat; however, the neck and head portions may be bent down to emulate a fowl or bird eating. A low glare coating may be applied to the painted image to reduce any reflection and/or flocking applied for reduced glare. The decoy is advantageous and useful as it is designed for effective hunting and for convenient storage and transportation due to being stackable and light weight.

16 Claims, 15 Drawing Sheets

(56) References Cited

U.S. PATENT DOCUMENTS

| | | | |
|---|---|---|---|
| 4,651,459 A | 3/1987 | Wurtz | |
| 4,845,872 A | 7/1989 | Anderson | |
| 4,928,418 A * | 5/1990 | Stelly | A01M 31/06 43/3 |
| 5,003,722 A * | 4/1991 | Berkley | A01M 31/06 43/3 |
| 5,293,709 A | 3/1994 | Cripe | |
| 5,595,012 A | 1/1997 | Coleman | |
| 5,613,317 A | 3/1997 | Ninegar | |
| 5,682,702 A * | 11/1997 | McKnight | A01M 31/06 43/3 |
| 6,085,452 A * | 7/2000 | Davis | G01C 15/06 116/209 |
| 6,092,322 A | 7/2000 | Samaras | |
| 6,115,953 A | 9/2000 | Wise | |
| D437,382 S | 2/2001 | Krise et al. | |
| 6,349,902 B1 * | 2/2002 | Cripe | A63H 27/08 244/153 R |
| 6,481,147 B2 | 11/2002 | Lindaman | |
| 6,640,483 B2 * | 11/2003 | Nelson | A01M 31/06 43/2 |
| 6,643,971 B2 | 11/2003 | Daniels | |
| 6,698,132 B1 | 3/2004 | Brint | |
| 7,028,429 B1 * | 4/2006 | Druliner | A01M 31/06 43/3 |
| 7,090,557 B1 * | 8/2006 | Ainsworth, Jr. | A63H 29/14 446/176 |
| 8,082,689 B2 | 12/2011 | Eggleston | |
| 8,151,512 B2 * | 4/2012 | Latschaw | A01M 31/06 43/2 |
| D764,011 S | 8/2016 | Buckway | |
| 9,532,565 B2 | 1/2017 | Anson et al. | |
| D794,155 S | 8/2017 | Buckway | |
| 2002/0073598 A1 * | 6/2002 | Wright | A01M 31/06 43/3 |
| 2003/0024146 A1 * | 2/2003 | Spady | A01M 31/06 43/3 |
| 2003/0192226 A1 * | 10/2003 | Cain | A01M 31/06 43/3 |
| 2003/0208944 A1 * | 11/2003 | Olson | A01M 31/06 43/3 |
| 2004/0237373 A1 * | 12/2004 | Coleman | A01M 31/06 43/3 |
| 2007/0295858 A1 * | 12/2007 | Higham | A63H 27/008 244/22 |
| 2008/0163538 A1 * | 7/2008 | Butz | A01M 31/06 43/3 |
| 2010/0275499 A1 * | 11/2010 | Eggleston | A01M 31/06 43/3 |
| 2014/0245653 A1 | 9/2014 | Foster | |
| 2015/0173347 A1 | 6/2015 | Lawton | |
| 2015/0223447 A1 * | 8/2015 | Miller | A01M 31/06 43/2 |
| 2016/0088831 A1 | 3/2016 | Mormile | |
| 2016/0128319 A1 | 5/2016 | Smart | |
| 2017/0006855 A1 * | 1/2017 | Wessel | A01M 31/06 |
| 2017/0238531 A1 * | 8/2017 | Clyncke | A01M 31/06 |
| 2019/0021305 A1 * | 1/2019 | Carvalho | A01M 31/06 |
| 2019/0069536 A1 * | 3/2019 | Davis | A01M 31/06 |

\* cited by examiner

DECOY

CROSS REFERENCE TO RELATED APPLICATIONS

The present application claims priority from utility provisional U.S. Pat. App. No. 62/649,090 filed on Mar. 28, 2018, which is incorporated by reference herein in its entirety.

FIELD OF THE INVENTION

The present disclosure relates to a decoy, and in particular it relates to an elevated horizontal decoy which may be staked to the ground at a first portion to produce a shadow on the ground emulating a real target bird, as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

In the past, numerous decoys have been provided in prior art that are used to attract birds, particularly fowl and waterfowl. However, prior art decoys are usually characterized by a number of undesirable features which limit their utility, for instance, a lack of compactness, inflexibility, heavy weight, and a high cost of manufacture. The illustrative disclosure relates to a decoy in one embodiment comprising a body portion, a neck portion and a head portion. The neck and body portions may be configured as generally flat and horizontal wherein the head portion may be bent down to a lower position than the body and neck portions thereby resembling or emulating a target bird eating. The decoy may be constructed from a corrugated material having a plurality of voids allowing the insertion of a rod to the head portion. The rod connects the decoy (head portion) to the ground surface which allows the decoy to elevate off the ground and be viewable from all elevated angles to other birds (waterfowls) which may be approaching via flight from a higher elevation. In another embodiment, a low glare coating or a flocking may be applied to the painted image on the decoy to reduce any reflection and glare. In another embodiment, the decoy may be dual sided, i.e. a first surface made to look like one species of bird (a duck for example) and a second surface a different species of bird (a snow goose for example). In another embodiment, the rod may be inserted at the end of the decoy (tail portion). The rod connects the decoy (tail portion) to the ground surface which allows the decoy to bounce vertically and to swing horizontally which makes the decoy look more attractive to the birds flying overhead.

DETAILED DESCRIPTION—BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION—LISTING OF ELEMENTS

Figure 1:
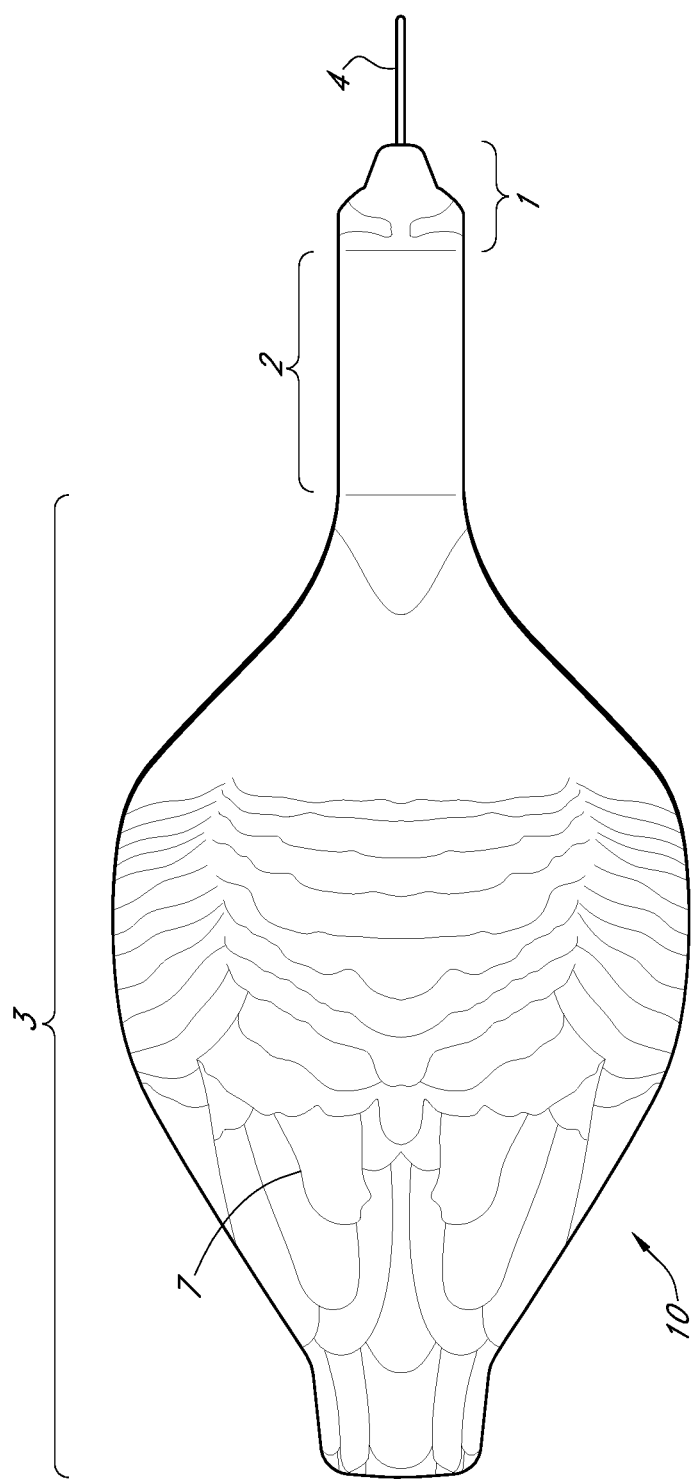
FIG. 1 is a perspective view of a two-dimensional decoy having a body portion, a neck portion and a head portion to emulate a target bird as shown and disclosed herein.

| Element Description | Element Number |
| --- | --- |
| Head portion | 1 |
| First end (head) | 1a |
| Second end (head) | 1b |
| Neck portion | 2 |
| First end (neck) | 2a |
| Second end (neck) | 2b |
| Body portion | 3 |
| First end (body) | 3a |

-continued

| Element Description | Element Number |
| --- | --- |
| Second end (body) | 3b |
| Rod | 4 |
| Ground | 5 |
| Shadow | 6 |
| Painted image | 7 |
| Void | 8 |
| Target bird (not shown) | 9 |
| Decoy | 10 |
| First end (head) | 10a |
| Second end (tail) | 10b |
| Top | 10c |
| Bottom | 10d |

DETAILED DESCRIPTION OF INVENTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense but is made merely for the purpose of illustrating the general principles of the invention, since the scope of the invention is best defined by the appending claims. Various inventive features are described below herein that can each be used independently of one another or in combination with other features.

Illustrative Embodiment and Advantages of Invention

The present disclosure relates to a decoy 10 emulating a target bird 9 (not shown) eating. FIG. 1 is a perspective view of a two-dimensional decoy 10 having a body portion 3, a neck portion 2 and a head portion 1 as shown and disclosed herein to emulate a target bird 9 (not shown). In at least one embodiment, decoy 10 is an elevated horizontal decoy 10 off the ground 5 similar in dimension and position as the simulated target bird 9 (not shown) sought to be hunted or photographed while on the ground with its head down and eating. The decoy 10 having a first end 10a and a second end 10b is comprised of a body portion 3, a neck portion 2 and a head portion 1 wherein the head portion 1 is positioned at the first end 10a of the decoy 10 and the body portion 3 is positioned at the second end 10b of the decoy 10. The neck portion 2 is positioned between and connects the head portion 1 to the body portion 3 wherein the head portion 1 is bendable to a lower position to emulate a target bird 9 (not shown) eating. The body 3 and neck 2 portions are generally flat, non-vertical (or substantially horizontal) and above the ground 5. The neck portion 2 is positioned between and connects the head portion 1 to the body portion 2. The head portion 1 is generally perpendicular and connectable to the ground 5 to emulate a target bird 9 (not shown) eating with its head in a lowered position. The head 1, neck 2 and body 3 portions of the decoy 10, as shown and disclosed throughout, together substantially emulate the size and shape of the target bird 9 (not shown) without any limitation and/or restriction.

In addition, the decoy 10 may be constructed from a corrugated material having a plurality of voids 8 wherein the plurality of voids 8 extend from the first end 10a to the second end 10b of the decoy 10. One of ordinary skill will appreciate that other materials, including plastic, cardboard and or combinations therein, corrugated or non-corrugated, may be used, subject to a particular application or purpose, and as suitable for that particular application or purpose. Another feature of the decoy 10 is a rod 4 wherein the rod 4 is inserted to the head portion 1 which connects the decoy 10 to the ground surface 5. After bending the rod 4, the neck 2 and head 1 portions to the desired angle, the rod 4 is pushed down to the ground 5 to secure the decoy 10 to the ground 5 with the simulated a target bird shadow 6 present. One of ordinary skill will appreciate that the plurality of voids 8 facilitates the insertion of the rod 4 to the decoy 10 and secures the rod 4 to the decoy 10. One of ordinary skill will also appreciate that the present disclosure may be configured for construction using materials which are biodegradable and recyclable, subject to a particular use and/or application and/or configuration.

Figure 2:
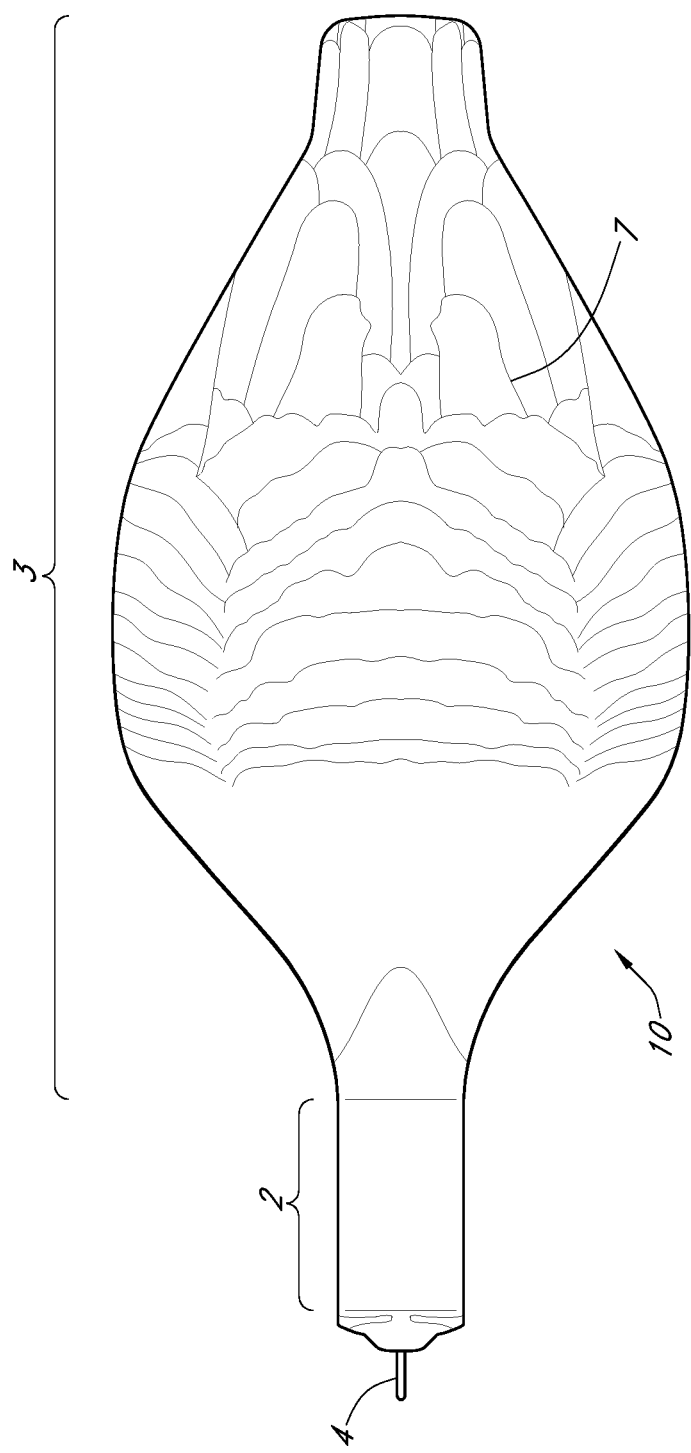
FIG. 2 is a top perspective view of a decoy having a painted image on one side to resemble a species of the target bird as shown in FIG. 1.
Figure 3:
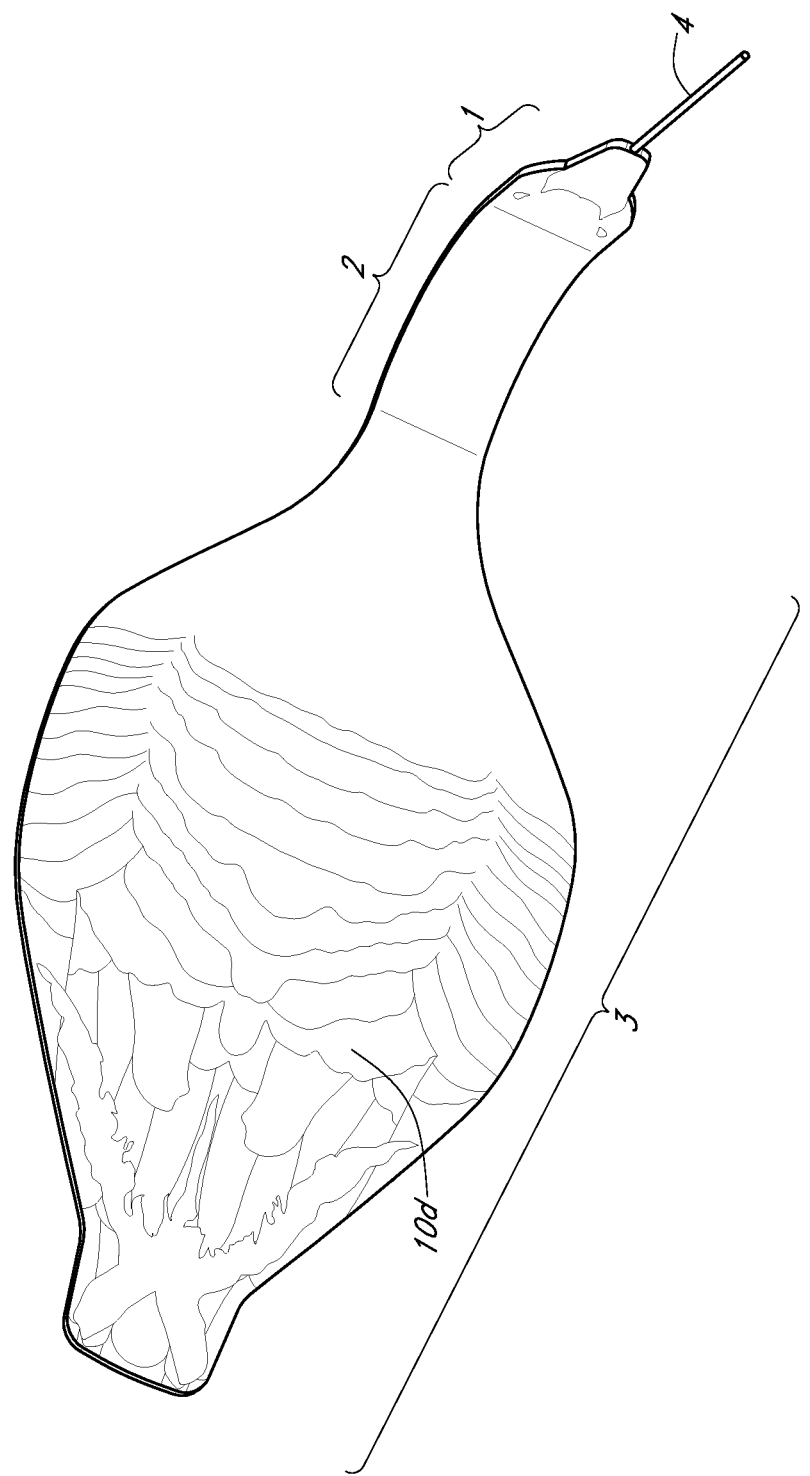
FIG. 3 is a bottom perspective view of a decoy having a different painted image on the other side of the decoy to resemble a different target bird than that at FIG. 2.

Another aspect of the decoy 10 is shown in FIGS. 2 and 3. As shown, FIG. 2 is a top perspective view of a decoy 10 having a painted image 7 at the top side 10c to resemble a specific target bird 9 (not shown). FIG. 3 is a bottom perspective view of a decoy 10 having a different painted image 7 on the bottom side 10d of the decoy to resemble a different target bird 9 (not shown). One of ordinary skill will appreciate that the decoy 10 is double-sided in this embodiment and has one species of the target bird 9 (not shown) presented on one side and a different target bird 9 (not shown) of equivalent size on the other side. Dependent on different species of the huntable species or the target bird 9 (not shown), the painted image 7 can be customized in order to be attractive to the target bird 9 (not shown). The decoy 10 is not limited to two different species of target bird 9 (not shown) and may also have the same species on each side, without limitation or restriction. The decoy 10 can be used to attract multiple species of the fowl or target bird 9 (not shown). The head portion 1, the neck portion 2 and the rod 4 are bendable which allow the decoy 10 to bend in the opposite direction when flipping the decoy 10; therefore, the bottom side of the decoy 10 may be flipped to face up showing a different image of a different target bird 9 (not shown). Another advantage of the present embodiment is that the decoy 10 could be reusable multiple times for multiple species. In another embodiment, a low glare coating may be applied to the painted image 7 on the decoy 10 to reduce any reflection and/or glare, without any limitation and restriction. Without reducing the reflection and/or glare, the flying bird or fowl aka target bird 9 (not shown) may recognize the fakeness; thus, the target bird 9 (not shown) will veer off or continue to fly to away from the decoy located in the hunting area. One of ordinary skill will appreciate that by reducing reflection and/or glare the decoy 10 may increase its resemblance to the real fowl or target bird 9 (not shown) further improving its usefulness to attract the target bird 9 (not shown).

Figure 4:
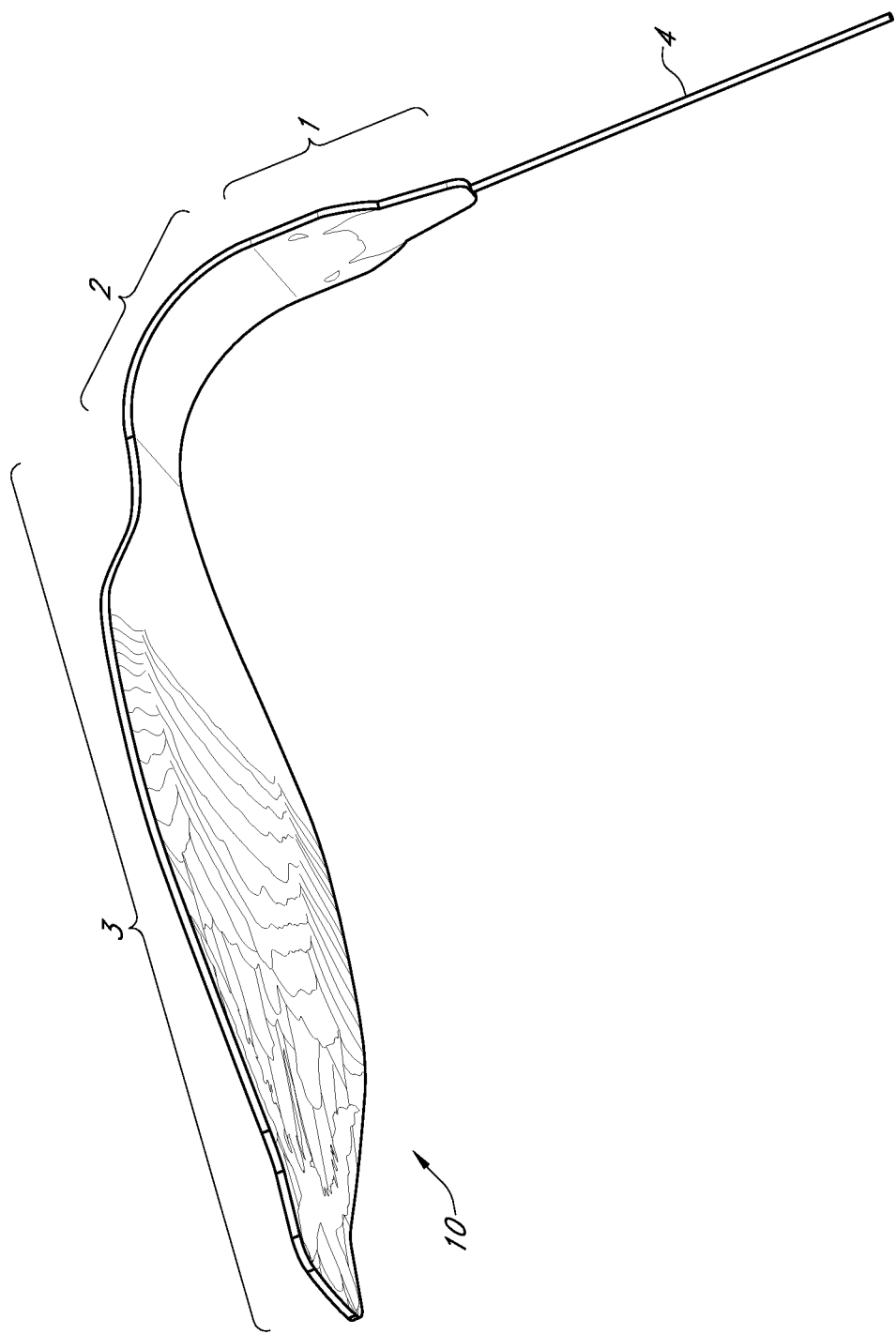
FIG. 4 is a side perspective view of a decoy as shown in FIG. 1.

As shown, FIG. 4 is a side perspective view of a decoy 10 as shown in FIG. 1. One of the benefits of the decoy 10 is that the embodiment is viewable to the fowls or target birds 9 (not shown) from all elevated angles (during flight) due to its broad flat body positioned above and parallel to the ground. The decoy 10 can then be "seen" by the target bird 9 (not shown) when directly above or when parallel to the decoy 10 unlike many standard prior art vertical silhouette decoys which do not present an image having breadth and/or a shadow to emulate a sitting or eating waterfowl on the ground. The target bird 9 (not shown) when flying does not actually "see" the standard prior art vertical silhouette decoys as they do not have a breadth or dimension which is visible to them from all elevated angles (during flight).

Figure 5:
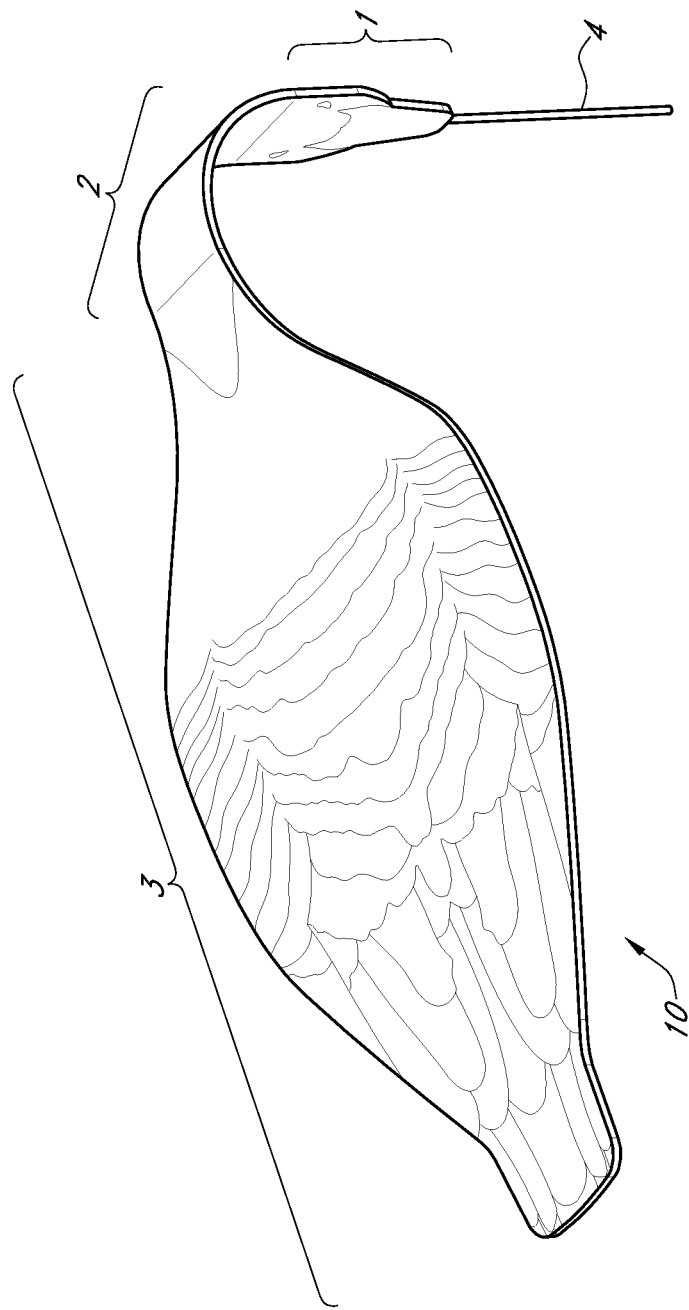
FIG. 5 is a perspective view of a decoy having a head portion bent down to the ground surface as shown in FIG. 1.

The decoy 10 as disclosed and shown throughout when viewed from above, gives the appearance of a target bird 9 (not shown) eating or sitting on the ground. The target bird 9 (not shown) is then lured down toward the decoy 10 thinking that it is a feeder location (not shown). FIG. 5 is a perspective view of a decoy 10 having a head portion 1 bent down to the ground surface 5 as shown in FIG. 1. The rod 4 is inserted at the head portion 1 of the decoy 10 and is bent to the desired angle. The rod 4 is then pushed to the ground 5 to secure the decoy 10 to the ground 5. The rod 4 may be constructed of, but not limited to, a metal such as steel, bronze and aluminum, or a combination therein. The ground 5 can be understood as land or marsh to those skilled in the art, without departure from the spirit and scope of the embodiment. The present embodiment works effectively to attract different huntable species including, but not limited, to waterfowl, geese, ducks and further may be used for any flying birds, etc. without any limitation and/or restriction. One of ordinary skill will appreciate that dependent on different hunting purposes, the body 3, neck 2 and head 1 portion of the decoy 10 could be customized in sizes and shapes to emulate different huntable (target) species.

Figure 6:
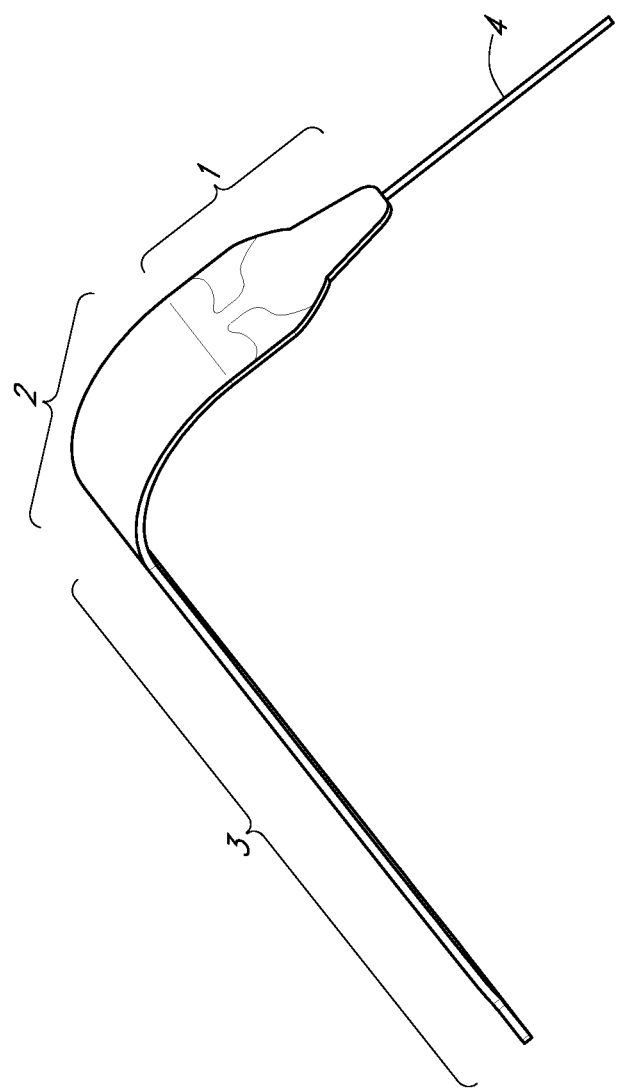
FIG. 6 is a top perspective view of a decoy having a head portion connecting to a rod as shown herein.
Figure 7:
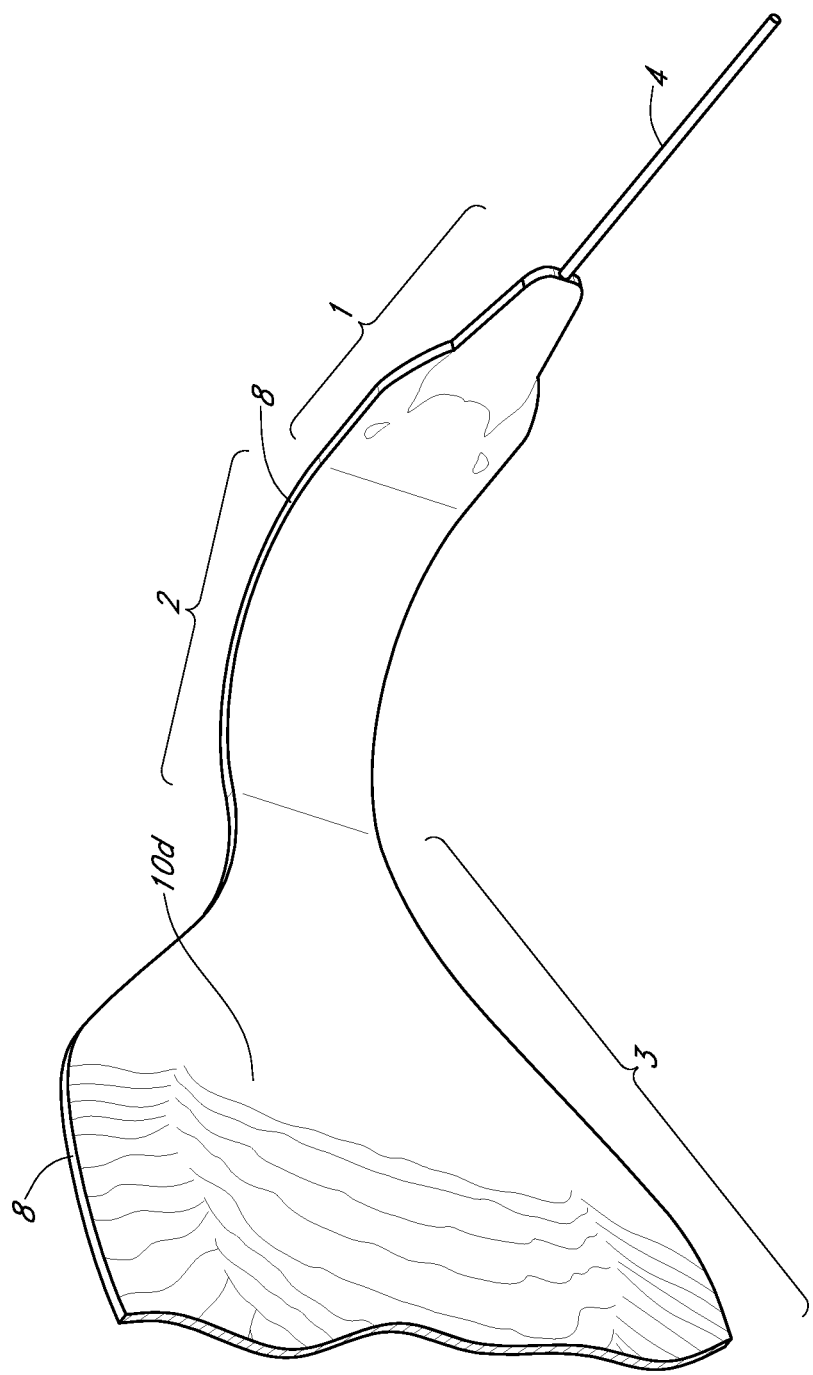
FIG. 7 is a bottom perspective view of a decoy as shown herein.
Figure 8B:
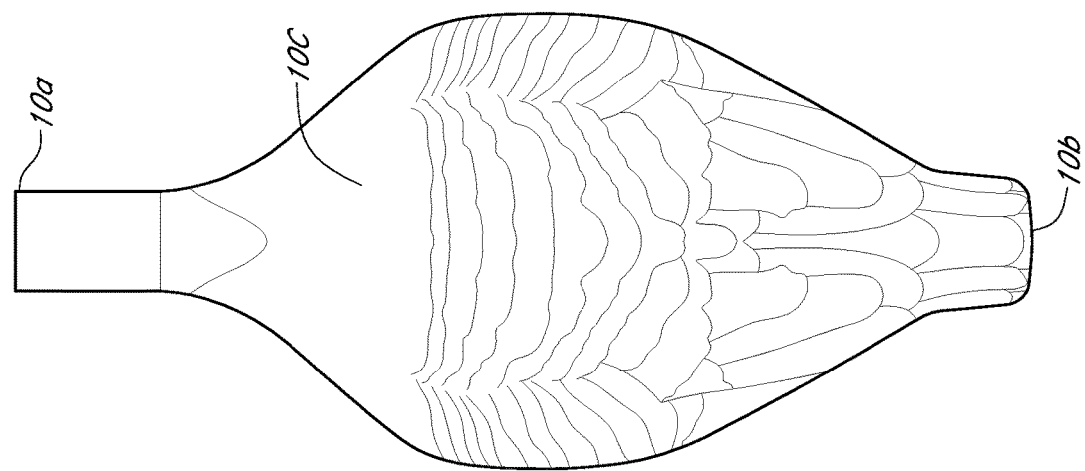
FIG. 8B is a top detailed view of a decoy (simulated Canada goose).
Figure 8A:
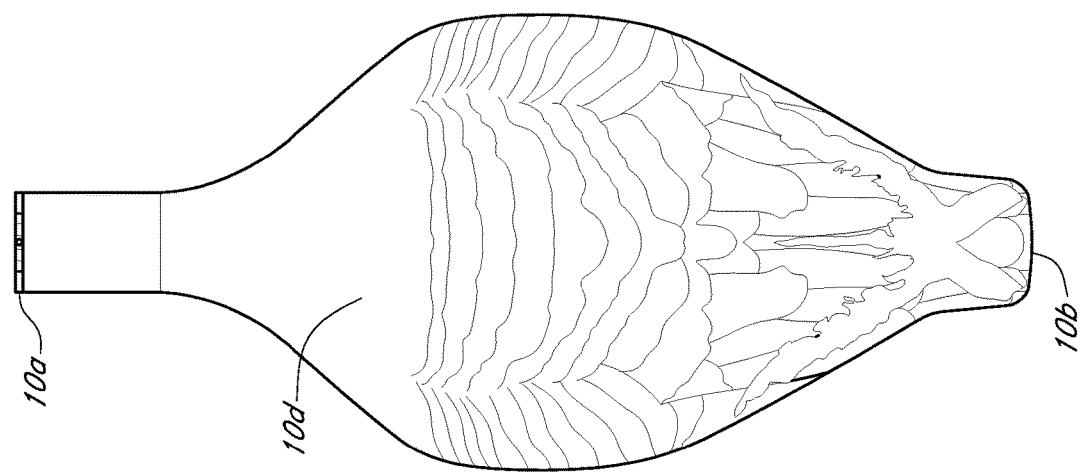
FIG. 8A is a bottom detailed view of a decoy (a simulated snow goose).
Figure 9:
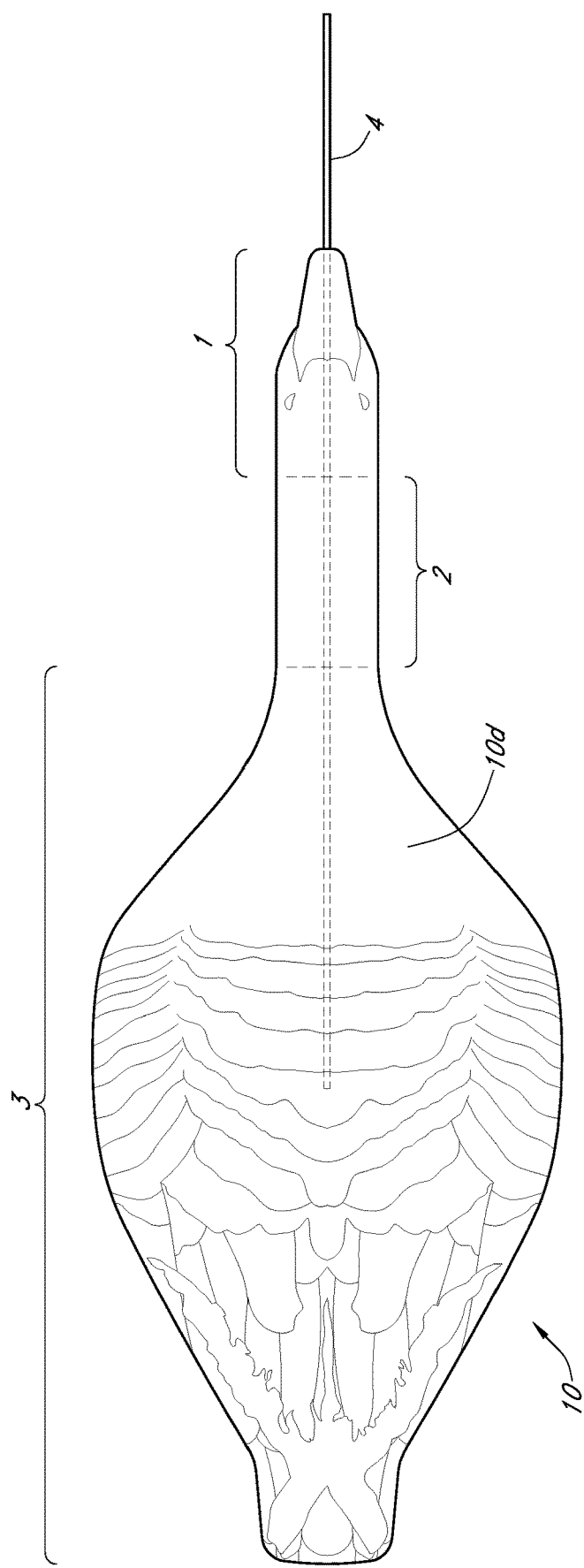
FIG. 9 is a bottom detailed view of a decoy having a rod inserting from the head portion to the body portion as shown herein.

FIG. 6 is a top perspective view of a decoy 10 having a head portion 1 connecting to a rod 4 as shown herein. FIG. 7 is a bottom perspective view of a decoy 10 as shown. As shown, the rod 4 can be inserted in the neck portion 2 and then can be bent in an arch or curve in order to prevent the decoy 10 from spinning from its horizontal position. The bending of the neck 2 and head 1 portions are designed to emulate a target bird 9 (not shown) or waterfowl eating, with its head down, which looks more attractive to other similar fowls, flying birds or target bird 9 (not shown) who are seeking large groups of eating waterfowl or target bird 9 (not shown) of a similar species. Large groups of eating fowl or target bird 9 (not shown) indicate safety, security and plenty of food to the target bird 9 (not shown) flying overhead thereby increasing the effectiveness of the decoy 10 in attracting target bird 9 (not shown). FIGS. 8A and 8B are a bottom side 10d and top side 10c detailed view of a decoy 10 as shown herein. The painted image 7 on FIG. 8A is a simulated snow goose while the painted image 7 on FIG. 8B is a simulated Canada Goose. FIGS. 8A and 8B demonstrate that the decoy 10 may be configured with two sides which are different and for attractive of two different target birds, doubling the utility of each decoy 10, without limitation or restriction. One of ordinary skill will also appreciate that the top side 10c and bottom side 10d may also have the same painted image 7 so as to make it easier to deploy the decoys in the field and have increase the longevity of the decoy. FIG. 9 is a bottom detailed view of a decoy 10 with the rod 4 inserted in the decoy 10 from the head portion 1, through the neck portion 2, to the middle of the body portion 3 as shown herein. The areas of desired bends are indicated and marked as broken line as illustrated and shown herein.

Figure 10:
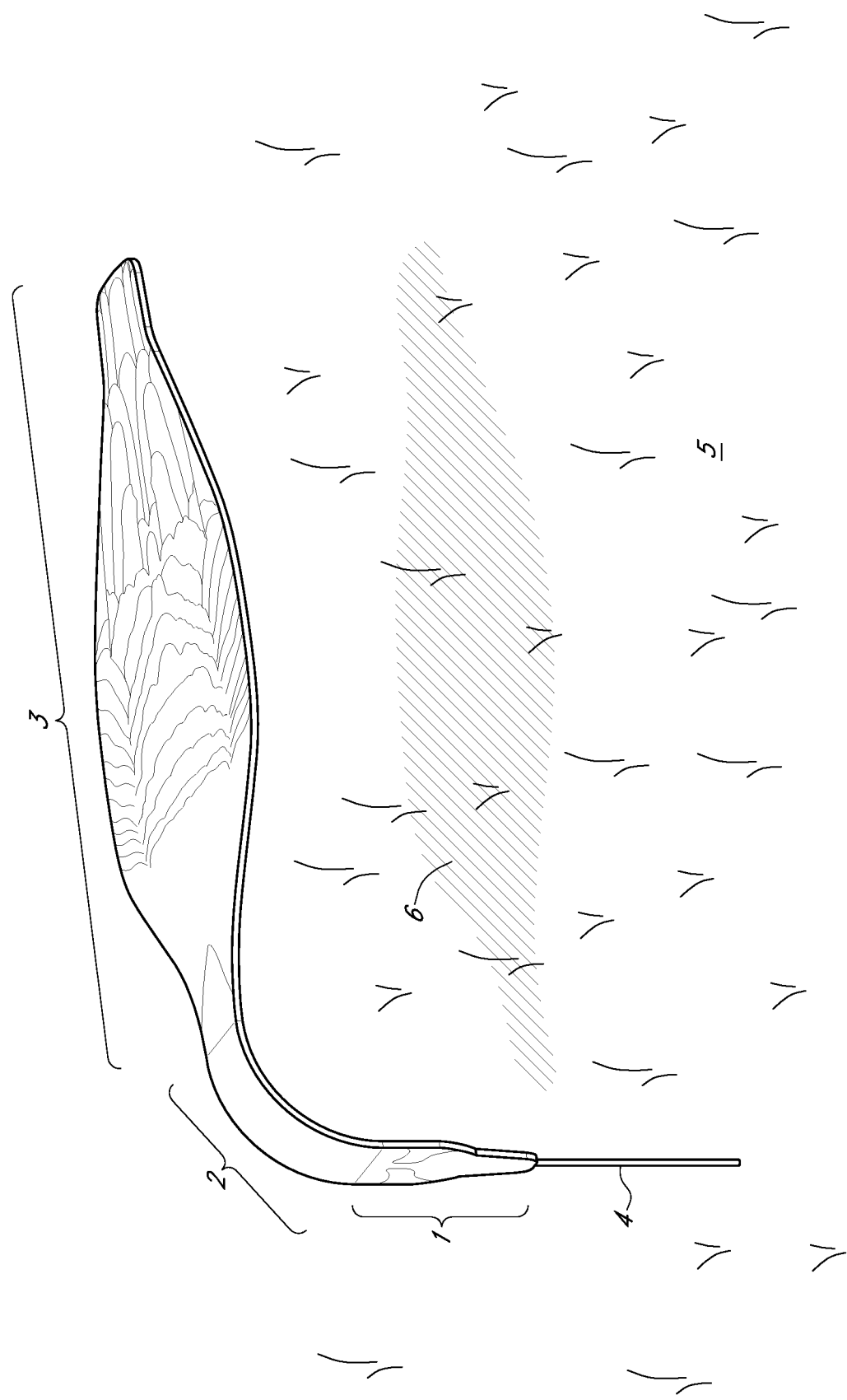
FIG. 10 is a perspective view of a decoy generating a shadow above the ground to which the decoy is attached.
Figure 11:
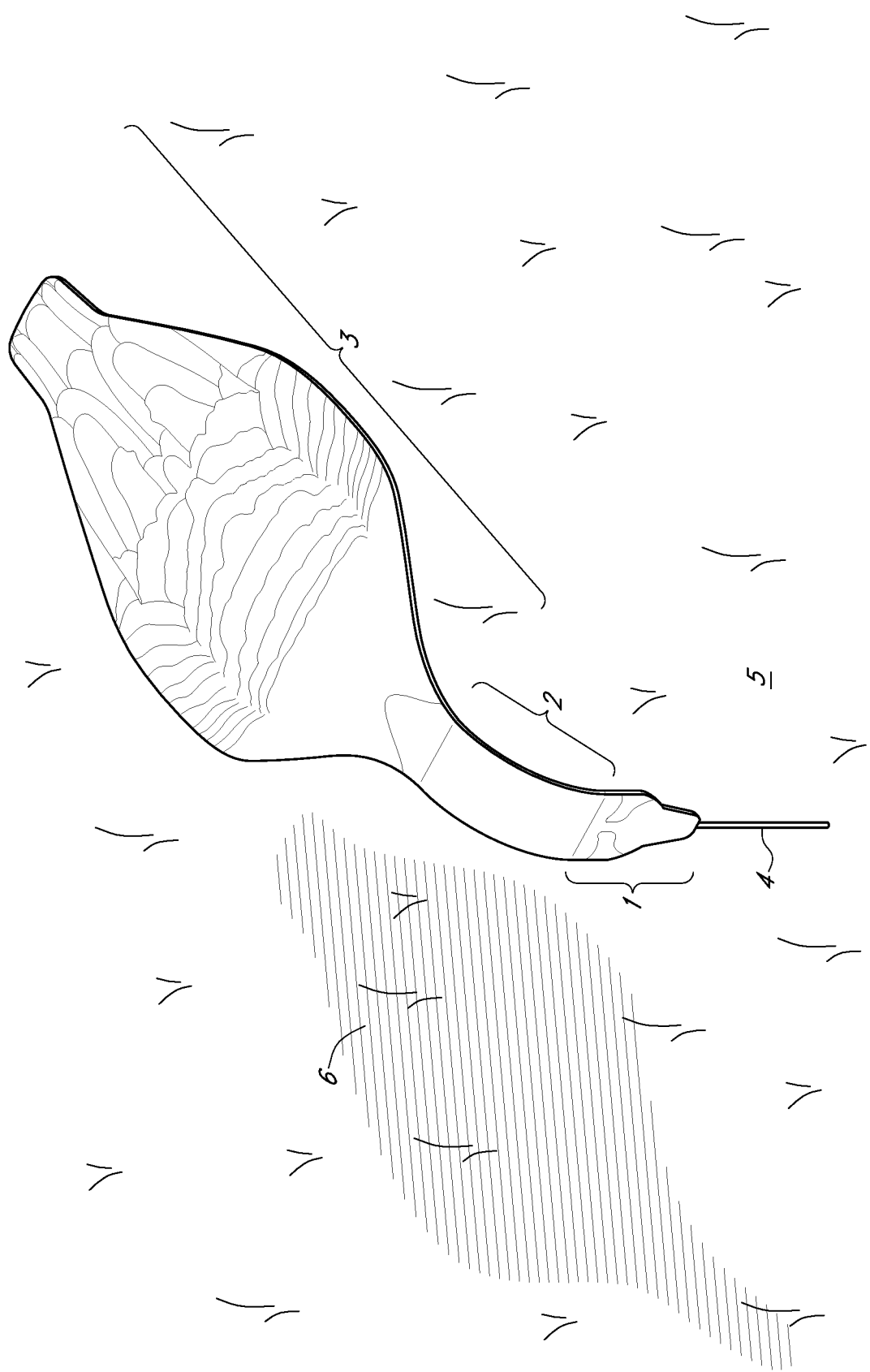
FIG. 11 is a top perspective view of a decoy generating a shadow above the ground to which the decoy is attached as shown herein.

Another aspect of the present embodiment is shown and illustrated in FIG. 10 and FIG. 11. As shown, FIG. 10 is a perspective view of a decoy 10 generating a shadow 6 above the ground 5 to which the decoy 10 is attached. FIG. 11 is a side perspective view of a decoy 10 generating a shadow 6 above the ground 5 to which the decoy 10 is attached as shown herein. One of ordinary skill will appreciate that the decoy 10 produces a shadow 6 on the ground similar to the real fowl or target bird 9 (not shown); therefore, further increasing the yield or attractiveness of the decoy in luring fowls or target birds (not shown) 9 to the hunting area. In addition, the body 3 has a bouncing and swinging effects to the decoy 10 which stimulate or emulate the real fowl or target bird 9 (not shown) eating.

Figure 12:
FIG. 12 is a perspective view of another embodiment of a decoy generating a shadow above the ground to which the rod is attached at the end of the decoy as shown herein.

Another version of the present embodiment is shown and illustrated in FIG. 12. As shown. FIG. 12 is a perspective view of another embodiment of a decoy 10 generating a shadow 6 above the ground 5 to which the rod 4 is attached at the second end 10b of the decoy (tail portion) as shown herein. One of ordinary skill will appreciated that the attachment of the rod 4 at the second end 10b of the decoy allows the decoy 10 to be more bounceable and swingable to the direction that the wind blows which makes the decoy 10 look more attractive to the fowl or target bird (not shown) 9. This configuration can be used to stimulate or emulate different huntable species, for instance, fowl, duck, geese, Canada geese, flying bird, etc. which is a great advantage and convenient when hunting. Depend on the hunting purposes, the hunter or user can insert the rod 4 at either at first end 10a or the second end 10b of the decoy, without any limitation and/or restriction.

Figure 13:
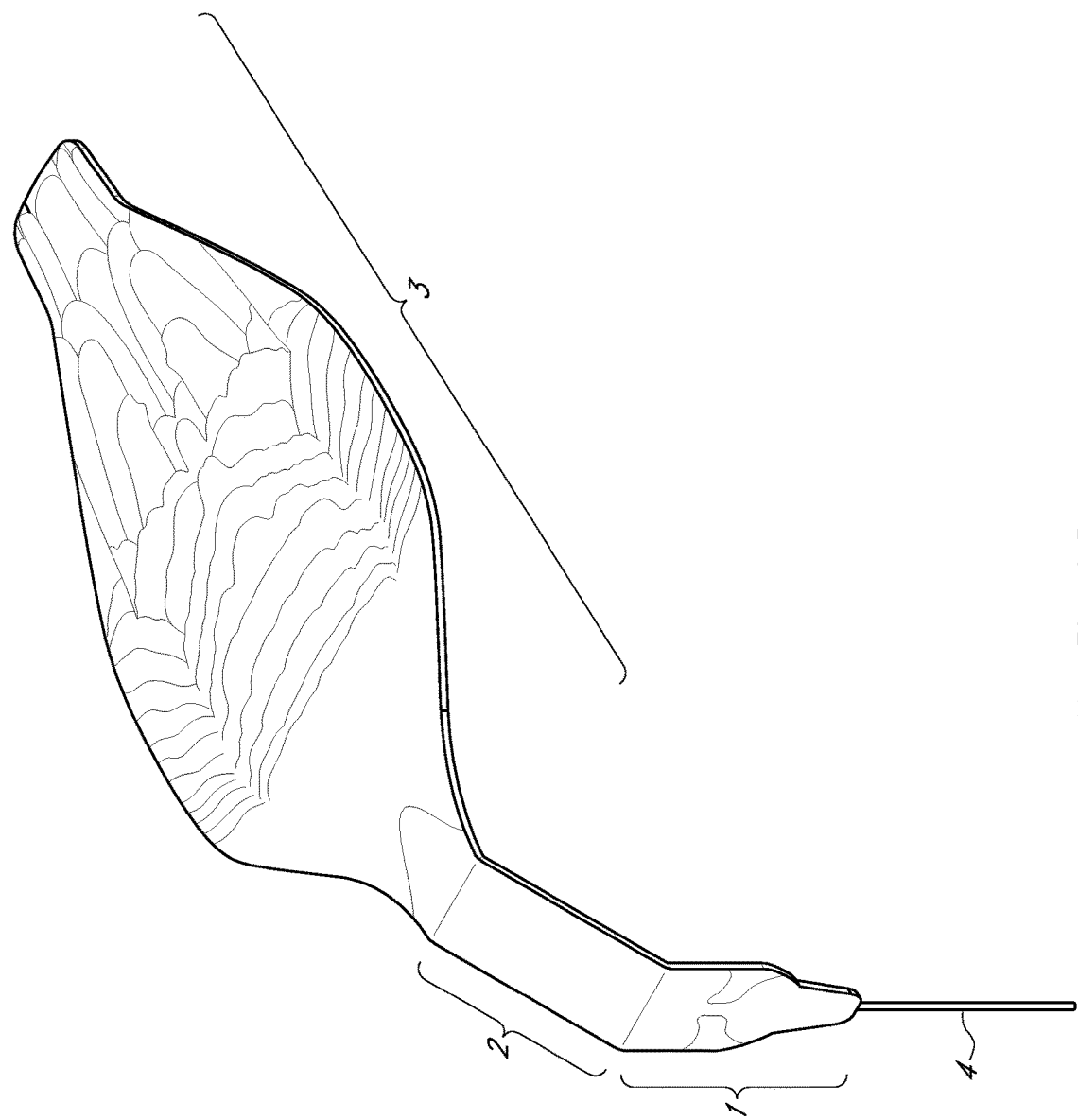
FIG. 13 is a perspective view of a decoy having a neck hinged between the head and the body portions.
Figure 14:
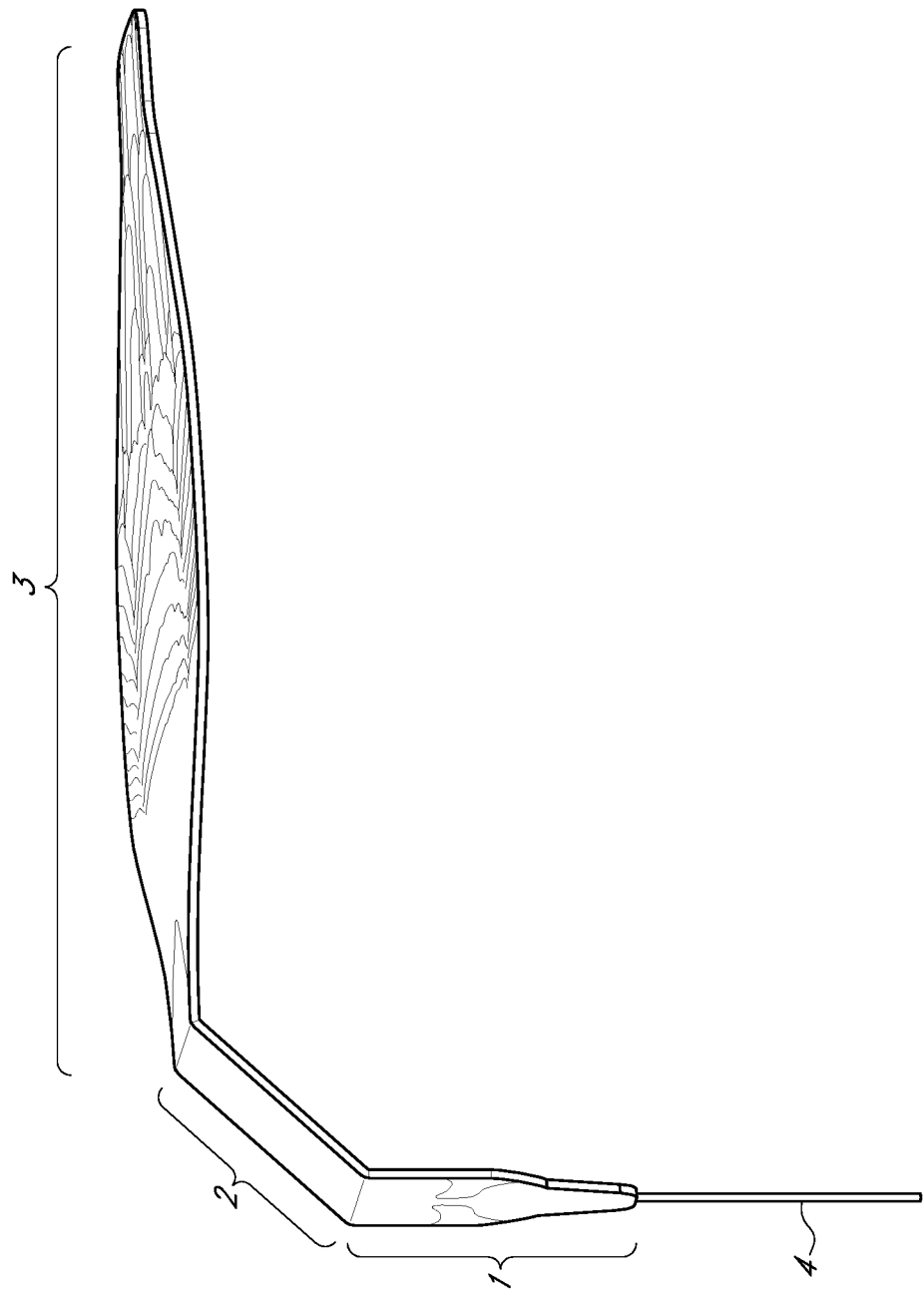
FIG. 14 is a side perspective view of a decoy as shown in FIG. 13.

FIG. 13 is a perspective view of a decoy having a neck hinged between the head and the body portions. FIG. 14 is a side perspective view of a decoy as shown in FIG. 13. As shown, the neck portion may be hinged between the head portion and the body portion. In another embodiment, the neck portion may be articulated between the head portion and the body portion. One of ordinary skill will be appreciate that dependent on the particular application, the attachment of the neck portion to the head and the body portions may be customized without any limitation and/or restriction unless otherwise indicated in the following claims.

Figure 15:
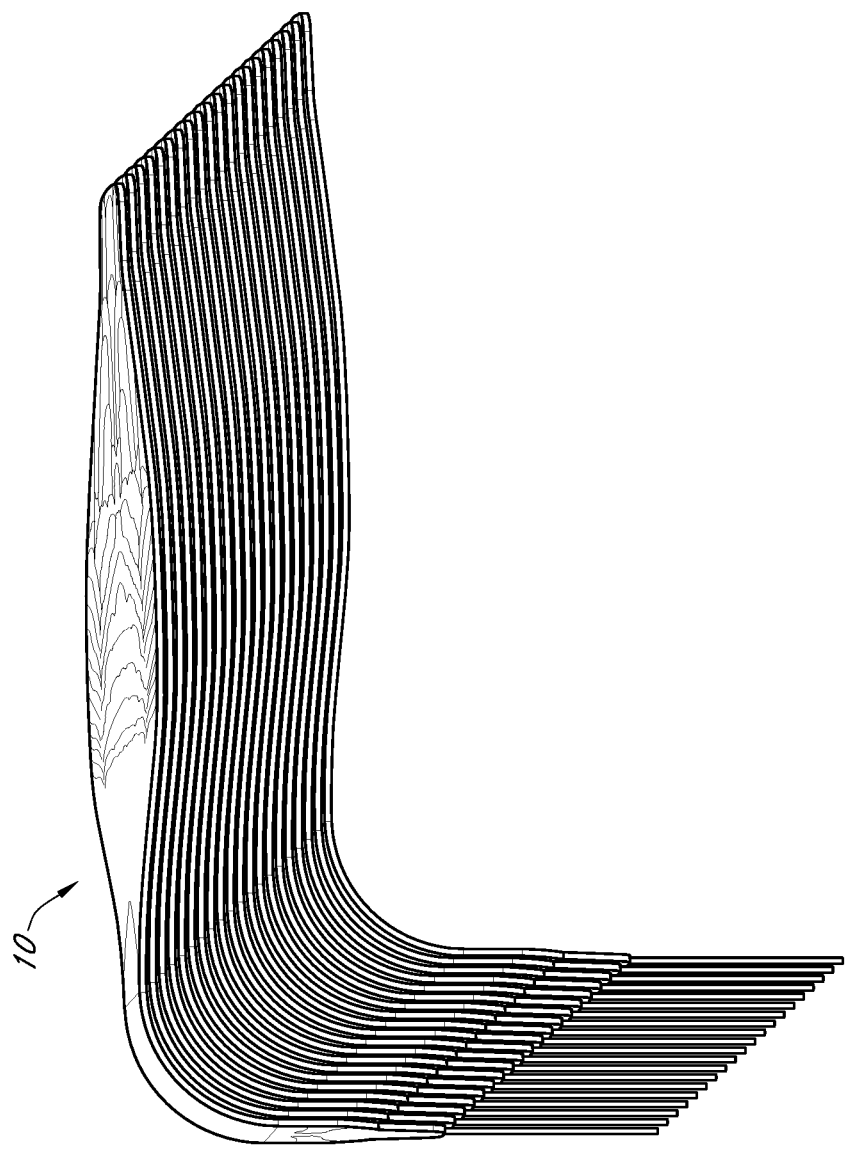
FIG. 15 is a perspective view of multiple decoys being stacked vertically when not in use.

FIG. 15 is a perspective view of multiple decoys 10 being stacked vertically when not in use. As shown, the decoy 10 is very compact so as to occupy a minimum of space during transportation or storage. Large stacks of decoys can be carried when placing them in the field with ease due to being stackable and light weight. As illustrated the attachment configuration does not require complex manufacturing; therefore, the production of the decoy 10 would be relatively economical and low maintenance cost. As disclosed, this feature of the invention further increases its effectiveness as the user can afford to field more decoys thus further improving the attractiveness of each decoy as target bird or fowl seek large groups of eating target birds or fowls for safety and security. One of ordinary skill will appreciate that depending on the materials selected, the decoy 10 and the rod 4 may be constructed together or constructed separately and conventionally attached together.

Another aspect of the present embodiment is the method for attracting a target bird (not shown) 9 for hunting using a decoy 10. The user inserts the second end of the rod 4 into the decoy 10 wherein the rod 4 is positioned in one of the voids 8 at the first end 10a of the decoy 10. The first end of the rod 4 is inserted into the head portion 1 and through the neck 2 to the body portion 3 with the second portion then affixed to the ground 5 as shown in at least FIGS. 10-11. Dependent on the particular application, the user selects the printed image 7 (either top 10c or bottom 10d) to attract the target bird (not shown) 9. Each side of the decoy has a different printed image 7 and is configured to emulate different target bird 9 (not shown), without any limitation and/or restriction. After selecting the printed image 7 and the side (top 10c or bottom 10d) of the decoy 10, the user bends the rod 4, the head 1 and the neck 2 portions wherein the head 1 and the neck 2 portions create an arc at an angle of approximately 90 degrees, without limitation or restriction. Bending the rod 4, the head 1 and the neck 2 portions allows the decoy 10 to emulate a target bird (not shown) 9 eating with the head 1 positioned in a lowered level. In addition, the body portion 3 of the decoy 10 positions above the ground 5 and creates a shadow 6 on the ground 5. Finally, the user pushes the first end of the rod 4 to the ground 5 to secure the decoy 10.

While certain specific embodiments have been described in detail, it is understood that the present disclosure will be appreciated by those skilled in the art and will be developed considering the overall teaching of the disclosure. Accordingly, the embodiments disclosed herein should not be construed as limitation on the scope of the invention but should be determined by the appended claims and their legal equivalents.

As one of ordinary skill will appreciate the present disclosure is not limited by the means of construction or the materials chosen as other suitable materials, including plastic, steel or aluminum, and combinations therein.

It should be noted that particular embodiment is not limited to the specific embodiments pictured and described herein but is intended to apply to all similar apparatuses and methods for providing the various benefits of those elements, which such benefits are explicitly and/or inherently disclosed herein. Modifications and alterations from the described embodiments will occur to those skilled in the art without departure from the spirit and scope of the decoy 10. Furthermore, variations and modifications of the foregoing are within the scope of the decoy 10. It is understood that the decoy 10 as disclosed herein extends to all alternative combinations of one or more of the individual features mentioned, evident from the text and/or drawings, and/or inherently disclosed. All of these different combinations constitute various alternative aspects of the decoy. The embodiments described herein explain the best modes known for practicing the decoy 10 and will enable others skilled in the art to utilize the same. The claims are to be construed to include alternative embodiments to the extent permitted by the prior art.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure and/or components thereof unless so indicated in the following claims. Furthermore, the methods and embodiments pictured and described herein are no way limiting to the scope of the present disclosure unless so stated in the following claims.

Any dimensions provided herein are for illustrative purposes only and in no way limit the scope of the present disclosure unless so indicated in the following claims. It should be noted that the present disclosure and/or components thereof are not limited to the specific embodiments pictured and described herein but are intended to apply to all similar apparatuses and methods for providing a predictive design analysis in a virtual environment. Modifications and alterations from the described embodiments will occur to those skilled in the art without departure from the spirit and scope of the present disclosure.

Any of the various features, components, functionalities, advantages, aspects, configurations, etc. for the present disclosure may be used alone or in combination with one another depending on the compatibility of the features. Accordingly, a nearly infinite number of variations of the present disclosure exists. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A decoy emulating a target bird eating comprising:
    a) a top side;
    b) a bottom side;
    c) a head portion positioned at a first end of the decoy;
    d) a body portion positioned at a second end of the decoy; and,
    e) a neck portion positioned between and connecting the head portion to the body portion, wherein the head portion is connectable to a ground surface via a rod extending through the head portion into the neck portion creating a bend between the head portion and the body portion to emulate the target bird eating with its head in a lowered positioned, wherein the neck and body portions of the decoy are constructed from a corrugated material to form a single surface that is generally flat with no vertical surfaces, wherein the corrugated material has a plurality of voids positioned in the single surface between and parallel to the top side and the bottom side.

2. The decoy emulating the target bird according to claim 1 wherein a rod is inserted in the head and neck portions for connecting the decoy to a ground surface.

3. The decoy emulating the target bird according to claim 1, wherein the rod is inserted in at least one if the plurality of voids in the corrugated material.

4. The decoy emulating the target bird according to claim 1 wherein the decoy generates a shadow above the ground to which the decoy is attached.

5. The decoy emulating the target bird according to claim 1 wherein the top side and the bottom side are configured to emulate different target birds.

6. The decoy emulating the target bird according to claim 1 wherein the decoys may be stacked vertically when not in use.

7. A decoy emulating a target bird eating comprising:
    a) a top side;
    b) a bottom side;
    c) a head portion positioned at a first end of the decoy;
    d) a body portion positioned at a second end of the decoy; and,
    e) a neck portion positioned between and connecting the head portion to the body portion, wherein the head portion is connectable to a ground surface to emulate a the target bird eating with its head in a lowered positioned, wherein the neck and body portions are generally flat with no vertical surfaces, the decoy constructed from a single surface from a corrugated material having a plurality of parallel voids positioned between and parallel to the top side and bottom side;
    f) a rod connecting the decoy to the ground surface, wherein the rod is positioned in one of the plurality of voids at the first end extending through the head portion and into the neck portion creating a bend between the head and body portion so that the positioned decoy emulates a target bird eating with its head in the louvered positioned.

8. The decoy emulating the target bird according to claim 7 wherein the rod has a first and a second end.

9. The decoy emulating the target bird according to claim 7 wherein the neck portion is adjustable between the head and the body portions.

10. The decoy emulating the target bird according to claim 7 wherein the neck portion is hinged between the head and the body portions.

11. The decoy emulating the target bird according to claim 7 wherein the decoy is swingable.

12. The decoy emulating the target bird according to claim 7 wherein the top side and the bottom side are configured to emulate different target birds.

13. The decoy emulating the target bird according to claim 7 wherein a glare coating is applied on a surface of the decoy to reduce reflection and glare of the decoy.

14. A method for attracting a target bird for hunting using a decoy comprising:
    a) inserting a second end of a rod into a decoy, wherein the decoy comprises:
        i) a top side;
        ii) a bottom side;
        iii) a head portion positioned at a first end of the decoy;
        iv) a body portion positioned at a second end of the decoy; and,
        v) a neck portion positioned between and connecting the head portion to the body portion, wherein the head portion is connectable to a ground surface via the rod which extends through the head portion and into the neck portion creating a bend between the head portion and the body portion to emulate a the target bird eating with its head in a lowered positioned,
        wherein the body portion emulates the target bird for which the decoy is intended;
        wherein the rod is positioned in one of a plurality of voids of a corrugated material at the first end so that the positioned decoy emulates a target bird eating with its head in the lowered positioned;
        wherein the corrugated material is a single surface and the plurality of parallel voids are positioned between and parallel to the top side and bottom side;
    b) selecting the printed image and the side of the decoy for attracting the target bird;

c) bending the rod, the head and the neck portions to create the bend at an angle of approximately 90 degrees; and d) pushing the first end of the rod into the ground to secure the decoy.

15. The method for emulating and attracting the target bird for hunting using the decoy according to claim 14 wherein the decoy is further comprising a top side and a bottom side.

16. The method for emulating and attracting the target bird for hunting using the decoy according to claim 15 wherein the top side and the bottom side are configured to emulate different target birds.

\* \* \* \* \*